Oct. 15, 1929.   H. C. MALLORY   1,731,582
INTERNAL COMBUSTION ENGINE
Filed Jan. 6, 1922   2 Sheets-Sheet 1
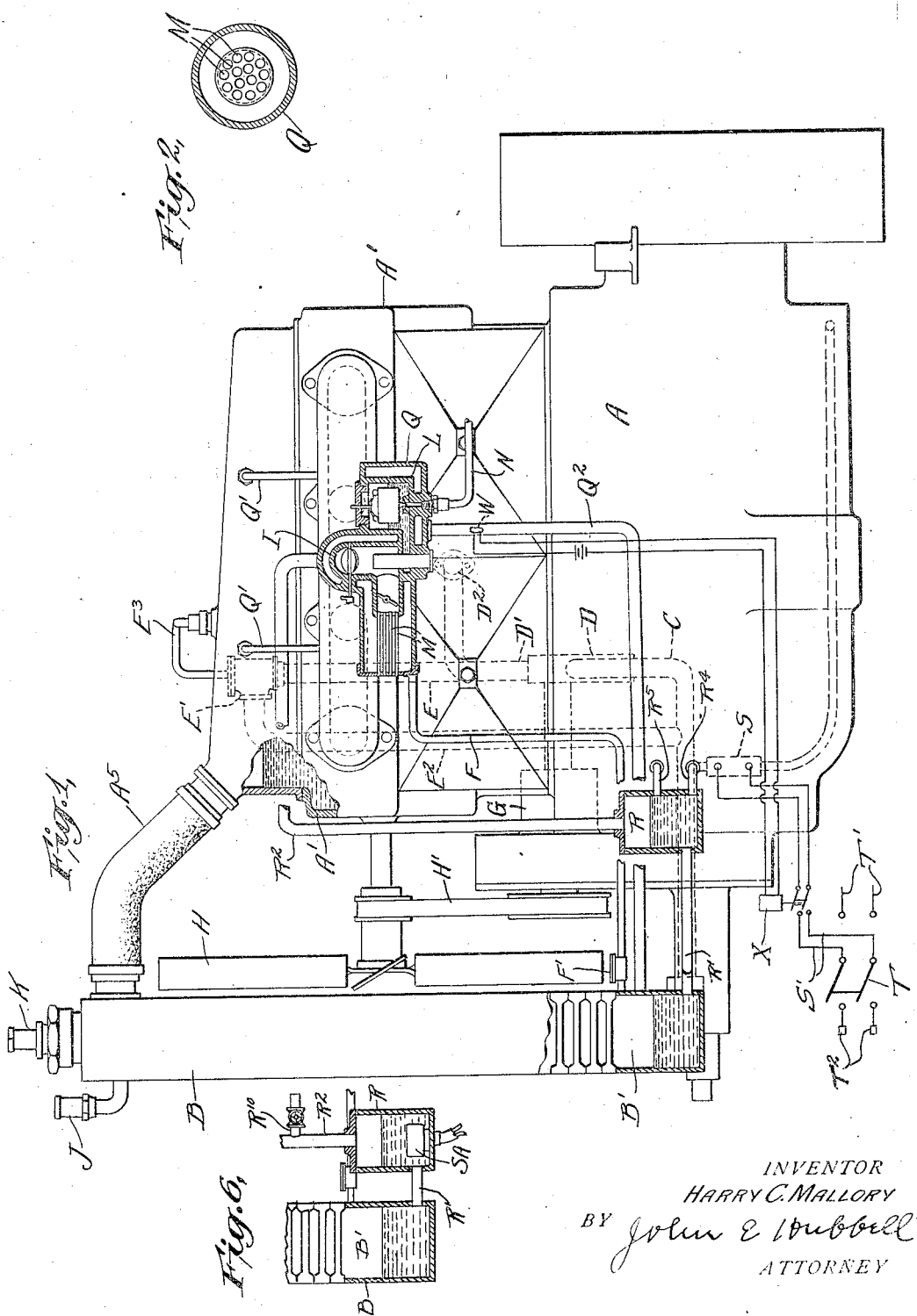
INVENTOR
HARRY C. MALLORY
BY John E. Hubbell
ATTORNEY

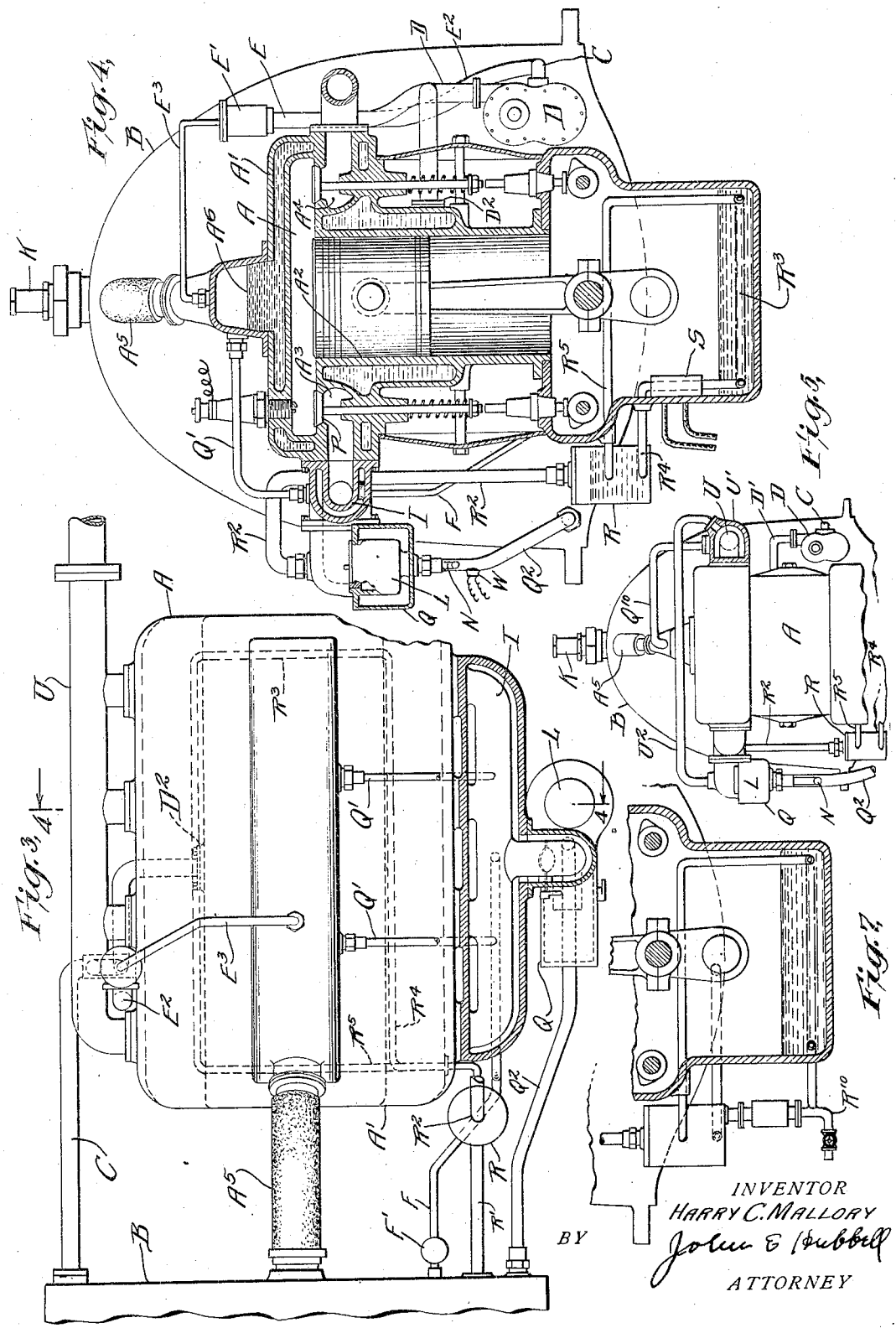

Patented Oct. 15, 1929

1,731,582

UNITED STATES PATENT OFFICE

HARRY C. MALLORY, OF NEW YORK, N. Y.; SUE R. MALLORY ADMINISTRATRIX OF THE ESTATE OF SAID HARRY C. MALLORY, DECEASED

INTERNAL-COMBUSTION ENGINE

Application filed January 6, 1922. Serial No. 527,504.

One general object of the present invention is to provide an effective method of, and means for heating the charge supply connections of an internal combustion engine so as to thereby preheat the fuel, and air for its combustion, introduced into the engine cylinder space, and to effect a better mixture of the air and fuel. Another general object of the invention is to provide effective means for supplying heat to the engine crank case and thus eliminating the difficulty in starting the engine in cold weather which is caused by cold lubricant in the crank case. The invention is of especial utility with an engine which, like automobile and aeroplane engines, is subjected to widely fluctuating external temperature conditions.

My present invention is most advantageously utilized in conjunction with, and in some of its aspects comprises combinations including, an engine having a cooling system of the boiling and condensing type. In such case I heat the engine charge supply connections, in the regular operation of the engine, by vapor from the cooling system, and the heating means for the charge supply connections thus serves as a vapor condenser which reduces the amount of work to be performed by the other condenser or condensers of the cooling system. Advantageously the boiling and condensing engine cooling system with which the present invention is utilized is one in which provisions are made for maintaining a regulated vapor pressure in the system in regular operation so that the temperature to which the charge is preheated may be normally maintained approximately constant.

When, as in the preferred mode of use referred to, the charge supply connections are heated in regular operation by heat derived from the engine cooling system, I advantageously provide auxiliary means for heating the charge supply connections when the engine is idle. The heating means provided for heating the charge supply connections when the engine is idle, advantageously serves as the means for supplying heat to the engine crank case also, as the latter ordinarily needs to be heated only at times when the engine is idle.

Such auxiliary heating means facilitate engine starting in cold weather and may also be used to prevent freezing in the engine cooling system.

In some cases I advantageously supplement the heat transmitted to the charge supply connections from the engine cooling system by waste heat derived by the engine exhaust. This is especially advantageous where, as in burning heavy oils of low volatility at ordinary temperatures in the engine cylinders it may be desirable to heat the charge supply connections to a temperature higher than the temperature of the vapor in the cooling system. In such case the vapor from the cooling system used in heating the charge supply connections may advantageously be superheated as by passing it through a jacket surrounding the exhaust connections of the engine.

The various features of novelty which characterize my invention are pointed out with particularity in the claims annexed to and forming a part of this specification. For a better understanding of the invention, however, and advantages and specific objects attained with its use, reference should be had to the accompanying drawings and descriptive matter in which I have illustrated and described preferred constructions and modes of carrying out my invention.

Of the drawings:

Fig. 1 is an elevation with parts broken away and in section;

Fig. 2 is a section on the line 2—2 of Fig. 1;

Fig. 3 is a plan view;

Fig. 4 is a section on the line 4—4 of Fig. 3;

Fig. 5 is a view taken similarly to Fig. 4 illustrating a modified form of apparatus;

Fig. 6 is a partial sectional elevation taken similarly to Fig. 1 illustrating a modification; and Fig. 7 is another partial sectional elevation taken similarly to Fig. 1, illustrating a second modification.

In the drawings and referring first to the construction shown in Figs. 1 to 4, A represents an internal combustion engine having a jacket A′, which surrounds the engine cylinders $A^2$ and the inlet and exhaust valve casings $A^3$ and $A^4$. Normally the jacket A′ is partially filled with a cooling liquid such as water, or a water alcohol mixture. A pipe connection $A^5$ leads from the vapor space in the jacket $A'$ to an air cooled surface condenser B. A pump D draws liquid from the bottom of the condenser B through the conduit C and passes it through the conduit $D'$ into the bottom of the engine jacket space $A'$ at $D^2$. A speed reduction gearing conventionally illustrated at G, forms a means for driving the condenser cooling fan H through a belt $H'$. F represents an air exhausting connection to the condenser from the suction intake manifold O of the engine. Advantageously the pipe F includes an air valve $F'$ permitting the free flow of air out of the condenser but restricting the escape of liquid or vapor from the latter. J represents a vacuum relief valve set to admit air to the condenser when the vacuum or minus pressure in the latter exceeds a predetermined amount, and K represents a safety valve employed to limit the maximum pressure in the system. E, $E'$ and $E^2$ represent a by-pass or overflow connection about the pump D the purpose of which is to normally maintain liquid in the engine jacket approximately to the level $A^6$, and thus insure at all times a free vapor space in the top of the jacket. The top of the by-pass connection is at the desired height of water level to be maintained in the jacket and consequently the latter will not drain through the by-pass connection when the engine and pump are idle. Advantageously a pressure equalizing connection $E^3$ is provided between the top of the engine jacket and the top of the by-pass connection to prevent the latter from becoming air bound and also to prevent the engine jacket from being drained by a siphon discharge through the by-pass connection.

The charge supply connections for the engine shown in Figs. 1 to 4 comprise a carburetor L, air inlet pipe M and a fuel supply connection N for the carburetor, and a manifold I through which the carburetor is connected to the inlet valves P of the engine. The carburetor L, intake pipe M, and manifold I are all jacketed, and as shown, these parts are all enclosed by a single jacket Q. $Q'$ represents inlets to the jacket Q from the vapor space in the engine cooling system. As shown the inlets $Q'$ open from the jacket $A'$ well above the normal liquid level $A^6$ in the latter. $Q^2$ represents a drain connection from the jacket Q through which liquid of condensation forming in the latter is returned to the engine cooling system at some point in the latter at the inlet side of the pump D, and through which any air entering the jacket Q will tend to flow by gravity into the condenser. As shown in Figs. 1 and 4, the drain connection $Q^2$ opens into the bottom tank or hot well $B'$ of the condenser B above the liquid level normally maintained in the latter.

In the construction shown in Figs. 1 to 4, a common heating system is provided to heat the engine crank case and to supply heat to the engine charge forming connections. This heating system in the form shown comprises a small tank R which is connected by the pipe $R'$ to the hot well $B'$ of the condenser below the water levels in the tank and hot well. A vapor outlet connection $R^2$ runs from the top of the tank R to the jacket Q. Associated with the tank R is a pipe $R^3$ which extends into and forms the heating device for the crank case. One end $R^4$ of the pipe $R^3$ is connected to the tank R at a lower level, while the other end $R^5$ of the coil is connected to the tank R at an upper level which, however, is below the normal water level in the tank. Suitable provisions are made for supplying heat to the auxiliary heating system in such manner as to effect circulation through the pipe $R^3$. In the construction shown, heat is supplied by means of an electric heater S which furnishes heat to the riser portion of the pipe $R^3$ between the end $R^4$ and the body of the pipe $R^3$, the latter as shown, being located at the bottom of the crank case so that normally it is wholly or partially immersed in the lubricant therein. The heat supplied by the heater S sets up a gravity water circulation through the pipe $R^3$, the water flowing into the pipe through its end $R^5$ and out of the pipe through its end $R^4$. From the water circulating system thus provided, the pipe connection $R^2$ forms a vapor outlet which supplies vapor to the jacket Q. The tank R provides an enlarged portion of the water circulating system which facilitates the disengagement of the vapor passing through the jacket Q.

When the engine A is mounted on an automobile provided with an electric lighting and engine starting system, suitable provisions are advantageously made for connecting the heater S at will to the electric lighting and engine charging system, and also to some external source of electric current, when this is desirable as in warming up the engine in a garage preparatory to starting it into operation. For this purpose I show diagrammatically in Fig. 1 a double throw switch T by which the terminals $S'$ of the heating coil S may be optionally connected to leads $T'$ from the engine lighting and starting system, or to contacts $T^2$ adapted to be connected to an external electric supply system, or may be disconnected both from the leads $T'$ and the contacts $T^2$.

In the preferred contemplated mode of operation of the apparatus shown in Figs. 1 to 4, heat is ordinarily supplied to the heater R only in warming up the engine preparatory to starting in cold weather, or in keeping the engine warm enough to prevent freezing in cold weather. With the engine A in operation, as much of the vapor generated in the jacket space A' passes through the connections Q' into the charge supply connection jacket Q, as is required to maintain a temperature in the latter which is the same as the temperature in the vapor space of the jacket A'. The remainder of the vapor generated in the jacket A' passes to the condenser B through the vapor connection A⁵ and is condensed in the latter. The liquid of condensation formed in the jacket Q passes back into the cooling system proper through the drain connection Q² and tank R, and mixes with the liquid of condensation formed in the condenser B.

When the heater S is in operation, all the vapor generated therein passes directly to the jacket Q through the connection R² and heats the enclosed parts of the charge supply connections. Vapor thus supplied by the tank R to the jacket and not condensed in the latter passes into the vapor space of the engine cooling system proper through the connections Q' and is condensed therein. The portion of the vapor from the tank R which will thus pass into the engine jacket A' will depend of course on the design of the apparatus which may be proportioned to keep the amount of vapor entering the jacket A' insignificant in amount in some cases, and large enough in other cases to prevent freezing in the engine jacket or condenser. Operated in the manner described, the air fuel mixture supplied to the inlet valves of the engine is not only preheated to a substantial amount but is preheated to an approximately constant temperature under varying conditions of use, which, as those skilled in the art know, tends to maximum efficiency and reliability of the carbureting apparatus. Only a comparatively small amount of water need be held in the tank R and coil R³, and the amount of heat required to generate the vapor required and to heat the crank case is comparatively small, especially if the tank R and exposed piping are insulated against heat radiation losses.

The use of auxiliary heating means for supplying heat to the engine crank case and to the engine charge forming connections when the engine is idle greatly facilitates the operation of starting the engine especially in cold weather. The electric current required for the operation of an electric heater for this purpose will ordinarily entail a much smaller demand on the electric lighting and charging system of an automobile, than would be required in starting the engine cold.

Where means for heating the engine crank case are dispensed with or are separate from the means provided to supply vapor to the charge forming connection jacket space when the engine is idle, vapor may be thus supplied to the jacket Q by means of the construction shown in Fig. 6 which differs essentially from that shown in Figs. 1 to 4 in that the coil R³ is dispensed with, and the auxiliary heater SA shown is an electric heating coil located in the tank R which thus becomes a tank heater. In lieu of locating the electric heater S in the crank case as shown in Figs. 1 to 4, it may be located externally of the crank case as shown in Fig. 7. This location makes the heater itself more accessible for inspection and repairs, though it tends to increase the loss of heat by radiation from the auxiliary heating means.

In the modification shown in Fig. 5 provisions are made for superheating the vapor passed from the cooling system into the discharge supply jacket Q by heat derived from the exhaust gases from the engine when the latter is in operation. For this purpose a jacket U' is placed about the exhaust manifold U and one or more connections Q¹⁰ pass vapor from the top of the jacket A' into the jacket U', and one or more connections U² are provided for passing the vapor superheated in the jacket U' into the jacket space Q. In Fig. 5 the direct connections Q' from the jacket A' to the jacket Q are omitted. Except in the respects noted the apparatus shown in Fig. 5 may be like that shown in Figs. 1 to 4 inclusive.

With the apparatus shown in Fig. 5 when the engine is in operation the temperature in the jacket space Q will be maintained substantially above the temperature in the jacket A' by the superheat imparted to the vapor passing through the jacket U'. It will be understood, of course, that with the apparatus shown in Fig. 5 as with the apparatus shown in Figs. 1 to 4, the connections providing the path of flow for the vapor supplied to the jacket Q from the engine cooling jacket A' should be of such relatively small flow resistance, as compared with the flow resistance of the vapor path from the jacket A' into and through the condenser B, that in regular operation a sufficient supply of vapor will continuously pass to the jacket Q to make up the vapor condensation occurring therein.

In lieu of, or in addition to an auxiliary heater such as is formed by the coils S and SA, provisions may be made for supplying heat to the engine from some source of heat not forming a part of the engine power plant proper to facilitate engine starting or to prevent freezing. For example, provisions may be made for injecting steam into the auxiliary heating system from any available source of steam in a garage or the like. For instance, as shown in Figs. 6 and 7, a valved steam inlet R¹⁰ may be provided to which a steam supply hose may be detachably connected at will.

To avoid an over supply of heat by the auxiliary heating means, provisions may be made for automatically regulating the supply of heat in response to the heating effect produced. For example, in the form of my invention shown in Figs. 1 to 4, a thermostat W provided in the return pipe $Q^2$ from the jacket space Q, is adapted to operate an electromagnetic control valve X so as to open or close the circuit through the heating coil S accordingly as the temperature in the pipe $Q^2$ reaches or is below a predetermined value. Automatic regulating provisions of the character just described are especially useful in case the auxiliary heating means is employed to keep the engine warm enough over night or for indefinite periods to prevent freezing and to facilitate prompt starting at any time. In such case the switch X will open and interrupt the supply of electric heating current to the coil whenever the predetermined temperature in the pipe $Q^2$ is reached, and when thereafter the temperature in the pipe $Q^2$ falls, the switch X closes and the supply of current to the coil S is resumed. It has heretofore been proposed to use vapor or liquid from an internal combustion engine cooling system to melt a solid hydrocarbon and thereby form a fluid fuel which could be fed into the combustion chambers of the engine. In such case the temperature to which the fuel is heated is dependent on the melting point of the fuel rather than on the temperature of the heating agent. Such a fuel melting arrangement is not an equivalent for the apparatus disclosed herein and designated by the terms "charge forming connections" or "charge supply connections" by which the fluid fuel and combustion air are supplied to the engine. My invention is distinguished from the prior proposal referred to in that the temperature of the vapor transferring heat directly to the fluid fuel and combustion air containing charge supply or forming connections of the engine directly regulates the temperature of the charge, and the fact that the temperature of the vapor is approximately constant as a result of the fact that it is taken from a cooling system in which a constant vapor pressure may be maintained is a significant and desirable feature of this invention.

While in accordance with the provisions of the statutes I have illustrated and described the best forms of my present invention now known to me, it will be apparent to those skilled in the art that changes may be made in the form of my invention without departing from the spirit of my invention as set forth in the appended claims, and that certain features of my invention may sometimes be used to advantage without a corresponding use of other features.

Having now described my invention, what I claim as new and desire to secure by Letters Patent, is:

1. The method of operating an internal combustion engine which consists in cooling the engine by vaporizing a cooling liquid and superheating the vapor thus formed with heat abstracted from the engine exhaust gases and heating the engine charge supply connections with the superheated vapor.

2. In an internal combustion engine having charge supply connections and a cooling system of the boiling and condensing type in which a liquid cooling agent is vaporized and the vapor formed is condensed and the resultant liquid of condensation is reused as the cooling agent continuously in normal operation, the improvement which consists in means for transferring to said supply connections some of the heat abstracted from the vapor to effect its condensation, and supplemental means for generating vapor to heat said connections.

3. The combination with an internal combustion engine having charge supply connections and a cooling system of the boiling and condensing type, of means for heating said connections comprising a jacket space and connections for passing vapor from said system into said jacket space and for returning liquid of condensation from said jacket space to said system, and a separate vapor generator connected to said system to receive liquid therefrom and having a vapor outlet connected to said jacket space.

4. The combination with an internal combustion engine having charge supply connections and a lubricant containing crank case and a cooling system in which a cooling liquid is vaporized, of means for heating said connections by the vapor formed in said cooling system and supplemental means for supplying heat to said connections and to the engine crank case.

5. The combination with an internal combustion engine having charge supply connections and a lubricant containing crank case, of means for supplying heat to said crank case and to said connections, including a liquid circulation heating system for the crank case, means for supplying heat to said system to effect a liquid circulation therein, a vapor outlet from said last mentioned system, and provisions for utilizing the vapor discharged through the said outlet in heating said connections.

6. The combination with an internal combustion engine having a lubricant containing crank case and a cooling system of the boiling and condensing type, the improvement which consists in crank case lubricant heating means comprising a liquid circulating system including a heat radiating portion for said crank case and a heater, and connections whereby said heating system receives liquid from, and passes vapor generated therein into said cooling system.

7. The combination with an internal combustion engine having charge forming connections and an enclosing jacket space, a lubricant containing crank case, and a cooling system of the boiling and condensing type, the improvement which consists in a crank case lubricant heating means comprising a liquid circulating system including a heat radiating portion for said crank case and a heater, and connections whereby said system receives liquid from the engine cooling system and passes vapor generated therein through said jacket space into said cooling system.

Signed at New York, in the county of New York and State of New York this 5th day of January, A. D. 1922.

HARRY C. MALLORY.